(12) United States Patent
Dunn et al.

(10) Patent No.: US 11,741,990 B2
(45) Date of Patent: *Aug. 29, 2023

(54) FLEXURE ASSEMBLY CONFIGURED TO REDUCE ELECTRICAL COUPLING AND MAINTAIN A HIGH SIGNAL BANDWIDTH

(71) Applicant: Magnecomp Corporation, Murrieta, CA (US)

(72) Inventors: Christopher G. Dunn, Austin, TX (US); Benjapa Tanampee, Ayutthaya (TH)

(73) Assignee: Magnecomp Corporation, Murrieta, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/056,158

(22) Filed: Aug. 6, 2018

(65) Prior Publication Data

US 2018/0342263 A1    Nov. 29, 2018

Related U.S. Application Data

(63) Continuation of application No. 15/350,036, filed on Nov. 12, 2016, now Pat. No. 10,043,541.

(60) Provisional application No. 62/266,603, filed on Dec. 12, 2015.

(51) Int. Cl.
*G11B 5/48* (2006.01)

(52) U.S. Cl.
CPC ............ *G11B 5/4853* (2013.01); *G11B 5/486* (2013.01); *G11B 5/4826* (2013.01); *G11B 5/4833* (2013.01); *G11B 5/4846* (2013.01)

(58) Field of Classification Search
CPC ........................... G11B 5/4853; G11B 5/4826
See application file for complete search history.

(56) References Cited

U.S. PATENT DOCUMENTS

| 5,249,092 A | * | 9/1993 | Russell-Smith | G11B 5/4886 360/264.2 |
|---|---|---|---|---|
| 5,687,479 A | * | 11/1997 | Bennin | G11B 5/4833 29/885 |
| 5,867,347 A | * | 2/1999 | Knight | G11B 5/4873 360/294.5 |

(Continued)

OTHER PUBLICATIONS

First Action Interview Pilot Program Pre-Interview Communication in U.S. Appl. No. 15/350,036, dated Jan. 6, 2017.

(Continued)

*Primary Examiner* — Brian E Miller
(74) *Attorney, Agent, or Firm* — DLA Piper LLP (US)

(57) ABSTRACT

In a disk drive having a flexible circuit tail that is routed within a recess in the actuator arm, a dielectric spacer is added to the top of the tail in order to space the circuit traces within the tail further away from the electrically conductive actuator arm, and to make more repeatable that spacing. The added spacing reduces electrical coupling and thus increases the bandwidth of the circuit. The spacer can be in the form of a section of the same viscoelastic material that is used elsewhere as a vibration dampener on the suspension, the viscoelastic material being adhered to the tail before the tail is inserted within the recess. Alternatively, the spacer can be a thickened region of the flexible circuit covercoat in the area where the tail will reside within the recess.

5 Claims, 10 Drawing Sheets

(56) References Cited

U.S. PATENT DOCUMENTS

| | | | | |
|---|---|---|---|---|
| 5,914,834 | A * | 6/1999 | Gustafson | G11B 5/4833 360/234.5 |
| 6,018,439 | A * | 1/2000 | Forbord | G11B 5/4833 360/264.2 |
| 6,046,886 | A | 4/2000 | Himes et al. | |
| 6,521,985 | B1 * | 2/2003 | Dossetto | G06K 19/07743 257/666 |
| 6,754,045 | B2 | 6/2004 | Korkowski et al. | |
| 7,158,350 | B1 * | 1/2007 | Carlson | G11B 5/486 360/266.3 |
| 7,724,478 | B2 * | 5/2010 | Deguchi | G11B 5/486 360/245.9 |
| 8,064,168 | B1 * | 11/2011 | Zhang | G11B 5/4833 360/245.4 |
| 8,276,256 | B1 | 10/2012 | Zhang et al. | |
| 8,325,446 | B1 | 12/2012 | Liu et al. | |
| 8,467,153 | B1 * | 6/2013 | Pan | H05K 1/189 360/264.2 |
| 8,503,133 | B2 | 8/2013 | Arai et al. | |
| 8,934,199 | B1 * | 1/2015 | Pan | G11B 5/4846 360/245.4 |
| 9,025,283 | B1 * | 5/2015 | Puttichaem | G11B 5/4853 360/245.9 |
| 9,165,580 | B2 | 10/2015 | Chen et al. | |
| 9,190,086 | B1 | 11/2015 | Ee et al. | |
| 9,524,738 | B1 | 12/2016 | Pan et al. | |
| 9,530,439 | B2 | 12/2016 | Chen et al. | |
| 9,564,156 | B1 * | 2/2017 | Shum | G11B 5/4853 |
| 10,043,541 | B1 * | 8/2018 | Dunn | G11B 5/486 |
| 2001/0011604 | A1 * | 8/2001 | Korkowski | H05K 3/366 174/250 |
| 2002/0109213 | A1 * | 8/2002 | Kovac | H01L 21/56 257/668 |
| 2002/0125044 | A1 * | 9/2002 | Johnson | H01L 23/49822 174/262 |
| 2004/0228039 | A1 * | 11/2004 | Wu | G11B 5/4846 360/264.2 |
| 2004/0240118 | A1 * | 12/2004 | Hayakawa | G11B 5/486 360/264.2 |
| 2005/0057268 | A1 * | 3/2005 | Blalock | G01R 19/0046 29/846 |
| 2005/0152070 | A1 * | 7/2005 | Funabashi | G11B 5/4833 360/265.7 |
| 2005/0152071 | A1 * | 7/2005 | Hayakawa | G11B 33/121 360/266.3 |
| 2005/0190503 | A1 | 9/2005 | Maeda et al. | |
| 2006/0023362 | A1 * | 2/2006 | Boljanovic | G11B 5/4853 360/244.1 |
| 2006/0114614 | A1 * | 6/2006 | Tsujino | G11B 5/5526 360/266 |
| 2009/0290262 | A1 * | 11/2009 | Suzuki | G11B 5/486 360/264.2 |
| 2010/0007993 | A1 | 1/2010 | Contreras et al. | |
| 2011/0198762 | A1 * | 8/2011 | Scanlan | H01L 24/19 257/793 |
| 2013/0045575 | A1 * | 2/2013 | Gorczyca | H01L 23/293 438/127 |
| 2016/0019918 | A1 * | 1/2016 | Juman | G11B 5/4873 360/244.2 |
| 2020/0294538 | A1 * | 9/2020 | Uehara | G11B 5/012 |

OTHER PUBLICATIONS

Office Action in U.S. Appl. No. 15/350,036, dated May 25, 2017.
Office Action in U.S. Appl. No. 15/350,036, dated Dec. 15, 2017.
Notice of Allowance in U.S. Appl. No. 15/350,036, dated Apr. 6, 2018.

* cited by examiner

FLEXURE ASSEMBLY CONFIGURED TO REDUCE ELECTRICAL COUPLING AND MAINTAIN A HIGH SIGNAL BANDWIDTH

CROSS-REFERENCE TO RELATED APPLICATIONS

This application is a continuation of U.S. patent application Ser. No. 15/350,036 filed Nov. 12, 2016, which claims priority from U.S. Provisional Patent Application No. 62/266,603 filed Dec. 12, 2015, each of the disclosures are incorporated by reference in their entirety as if set forth fully herein.

BACKGROUND OF THE INVENTION

1. Field of the Invention

This invention relates to the field of head stack assemblies of hard disk drives. More particularly, this invention relates to the field of a disk drive head stack assembly having a height-controlled suspension circuit tail tack.

2. Description of Related Art

Magnetic hard disk drives and other types of spinning media drives such as optical disk drives are well known. FIG. 1 is an oblique view of an exemplary prior art hard disk drive and suspension for which the present invention is applicable. The prior art disk drive unit 10 includes a spinning magnetic disk 12 containing a pattern of magnetic storage medium ones and zeroes on it that constitutes the data stored on the disk drive. The magnetic disk is driven by a drive motor (not shown). Disk drive unit 10 further includes a disk drive suspension 20 to which a head slider 34 (FIG. 2) is mounted proximate a distal end of load beam 24. The head slider contains magnetic read/write transducers, and thus constitutes a read/write head for writing data to, and reading data from, the data disk as the disk spins underneath the read/write head. The "proximal" end of a suspension or load beam is the end that is supported, i.e., the end nearest to base plate 22 (FIG. 2) which is swaged or otherwise mounted to an actuator arm 16. The "distal" end of a suspension or load beam is the end that is opposite the proximal end, i.e., the "distal" end is the cantilevered end.

Suspension 20 is coupled to actuator arm 16, which in turn is coupled to a voice coil motor 14 that moves the suspension 20 arcuately in order to position the head slider over the correct data track on data disk 12. Suspension 20 includes a suspension body portion, which normally comprises a base plate 22 and load beam 24. The head slider 34 is carried on a gimbal which is mounted to the suspension body. The gimbal allows the slider to pitch and roll freely so that it follows the proper data track on the disk, allowing for such variations as vibrations of the disk, inertial events such as bumping, and irregularities in the disk's surface. As shown, a vibration damper 25 of viscoelastic damper sheet material is attached to the load beam.

FIG. 2 is a top oblique partially exploded view of a prior art suspension 20 including a flexure 30, such as shown in U.S. Pat. No. 9,190,086 issued to Ee et al. and assigned to the present applicant. Suspension 20 includes a base plate 22 and a load beam 24, and a flexure 30 welded to the load beam. Suspension flexure 30 typically includes a metal support layer such as stainless steel, an insulating layer such as polyimide, and a signal conducting layer comprising copper or copper alloy, with individual copper traces defining individual signal traces that carry electrical control and data signals to and from head slider 34. The copper signal traces are typically covered and protected over most of their lengths by an electrically insulating covercoat or coverlayer, which is typically polyimide. The portion of flexure 30 that carries the signals defines a flexible circuit that is sometimes called the suspension circuit 40. The suspension circuit 40 typically includes a portion which extends proximal of the suspension body, called the circuit tail 41 or suspension flexure tail, or simply the tail.

FIG. 3 is an oblique top view of a typical prior art head stack assembly (HSA) 80 containing a number of separate actuator arms 16 and corresponding suspensions 20 including circuit tails 41. During manufacture of the Head Stack Assembly (HSA), manufactures typically tack the suspension flexure tail 41 in a slot or recess in the corresponding actuator arm 16 in order to prevent tail 41 from fluttering during drive operation due to the effects of wind on the tail. The recess extends generally longitudinally along the side of the actuator arm 16. This tacking process is typically performed by manufactures using a UV-curable adhesive. Area A, indicated by a circle in the figure, is the area in which circuit tail 41 enters or partially enters the slot in the side of actuator arm 16. Typically half the width of circuit tail 41 is inserted into the slot in actuator arm 16, causing either the read or write signal trace pair to be located within the gap. Thus, the flexible circuit tail 41 is at least partially secured within the slot, and is therefore at least partially shielded from the disk wind. To ease the HSA assembly process, the arm gap is typically much larger than the total thickness of the flexure tail which is typically 30 to 45 µm thick.

SUMMARY OF THE INVENTION

The current tail tack assembly method has worked well for many years in the disk drive industry, but as data rates continue to increase an improved assembly method is needed to better control the location of the suspension tail in the arm gap.

FIG. 4 is a sectional view of an actuator arm 16 including tail portion 41 according to the prior art. Arm gap, slot, or recess 18 is defined by a space between actuator arm upper wall 17 and actuator arm lower wall 19. A suspension tail 41 of circuit 40 is partially inserted in slot 18. Tail portion 41 of circuit 40 includes a metal support layer 42 which is typically stainless steel, a dielectric insulating layer 44 which is typically polyimide, copper signal traces 46 including copper signal traces 47 which are within gap 18, and a protective covercoat 48 which is typically polyimide. For purposes of discussion, signal trace pair 47 within gap 18 will be presumed to be the write signal trace pair. A typical prior art assembly method has been to use a tack adhesive 52 above and a tack adhesive 54 below tail 41 to help keep it within slot 18.

A shortcoming of the structure and assembly method of the prior art is that they do not control the vertical location of the tail 41 within arm gap 18. FIGS. 5A-5C are sectional views according to the prior art showing how the tail 41 location can vary from the top to the bottom of the gap 18 using prior art assembly methods.

Controlling trace impedance has become critical to new hard disk drive designs to achieve writer bandwidths that are 4 GHz or higher. The current tail tack process does not control the location of the tail 41 in arm gap 18; consequently, there is significant variation in the distance between the write signal traces 47 and the upper arm 17. If tail 41 is located near the top wall of the arm gap 18 as illustrated in FIG. 5A, then the write signal traces 47 can be very near upper arm 17, such as approximately 5 μm. This will lead to high electrical coupling of the write trace pair 47 to upper arm 17, versus the circuit tail 41 being located near the bottom of the arm gap 18 where the traces 47 are spaced over 25 μm from the arm 17 such as illustrated in FIG. 5C. This variability creates a large amount of variation in the electrical impedance of the circuit leading to large amount of bandwidth variation.

The graphs of FIGS. 8-11 show electrical simulations of a suspension design with tail 41 located at different points vertically within the arm recess 18 and the resulting impact on bandwidth. Locating tail 41 too close to the top wall 17 of arm gap 18 will cause the impedance to rise significantly and hence cause the bandwidth to drop significantly. In the worst case, the circuit bandwidth falls below 1 GHz.

The invention ensures at least a minimal spacing between the circuit traces that are disposed within the recess in the actuator arm, and the electrically conductive top wall of the actuator arm that forms the recess, in order to minimize electrical coupling and hence maintain a high signal bandwidth.

According to a first embodiment, a thin shim or spacer of dielectric material is added over the portion of the suspension circuit tail that gets inserted into the slot in the actuator arm. The spacer ensures a minimum separation distance between the circuit traces and the conductive upper wall of the slot, thus ensuring good bandwidth performance. That separation distance is greater than the specified nominal thickness of the covercoat of the circuit, including the nominal covercoat thickness over the traces within the slot. The spacer can be made of the same viscoelastic dampener sheet material from which suspension vibration dampers are commonly made, with advantages that the dampener sheet material is usually of controlled thickness, has a peel-off adhesive already on it, and the automated machinery that makes the suspension including applying the standard suspension vibration dampener can be easily modified to include placing the spacer on circuit tail 41.

In a second embodiment the spacer takes the form of a thickened portion of the covercoat over the signal traces within the recess, such that the covercoat is thicker or thickest over the circuit traces in the tail area that gets inserted into the actuator arm recess. The thickened portion keeps the circuit traces a minimum distance away from the conductive top wall of the actuator arm recess.

Exemplary embodiments of the invention will be further described below with reference to the drawings, in which like numbers refer to like parts. The drawing figures might not be to scale, and certain components may be shown in generalized or schematic form and identified by commercial designations in the interest of clarity and conciseness.

DETAILED DESCRIPTION OF THE PREFERRED EMBODIMENTS

Figure 1:
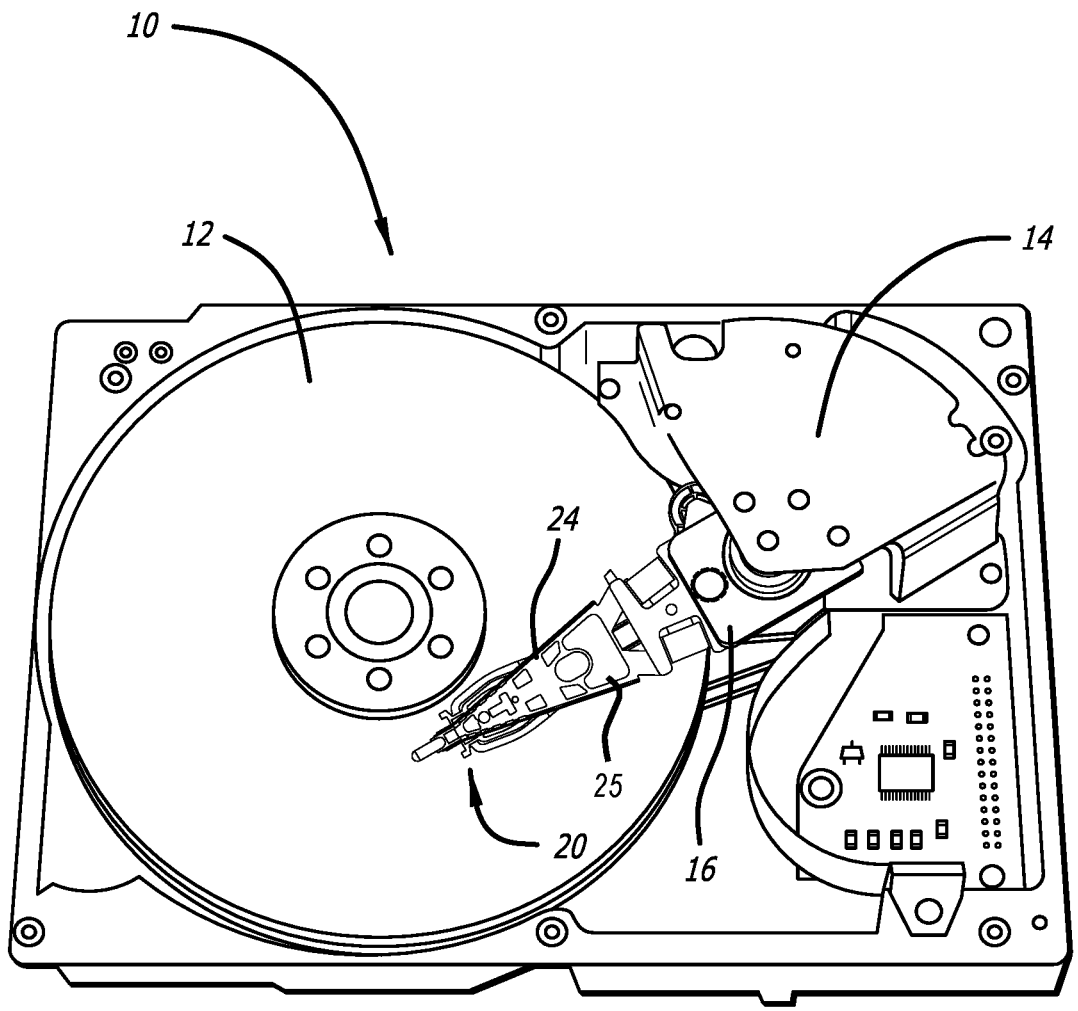
FIG. 1 is an oblique view of a prior art disk drive.
Figure 2:
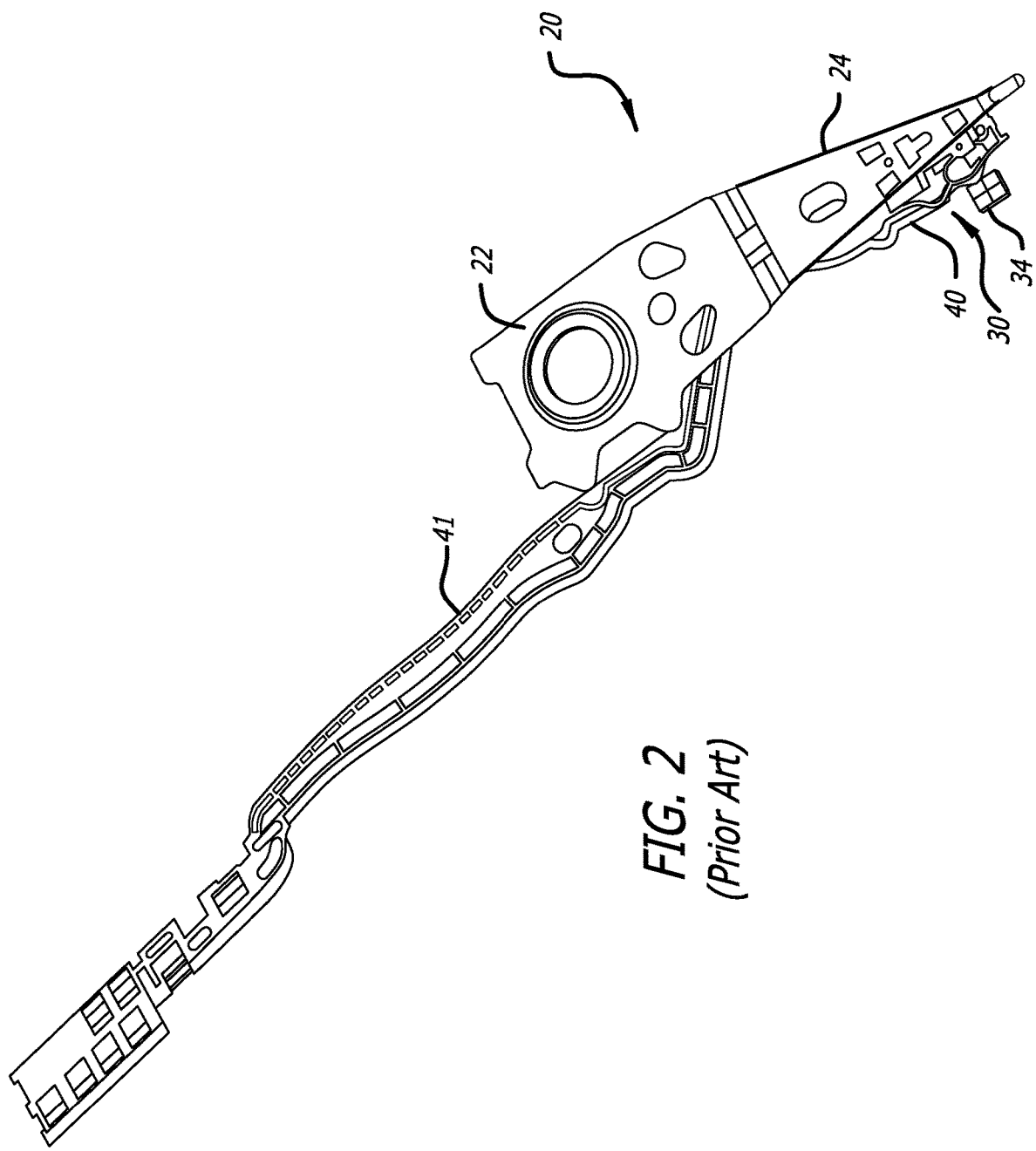
FIG. 2 is an oblique top partially exploded view of a prior art suspension including a flexure.
Figure 3:
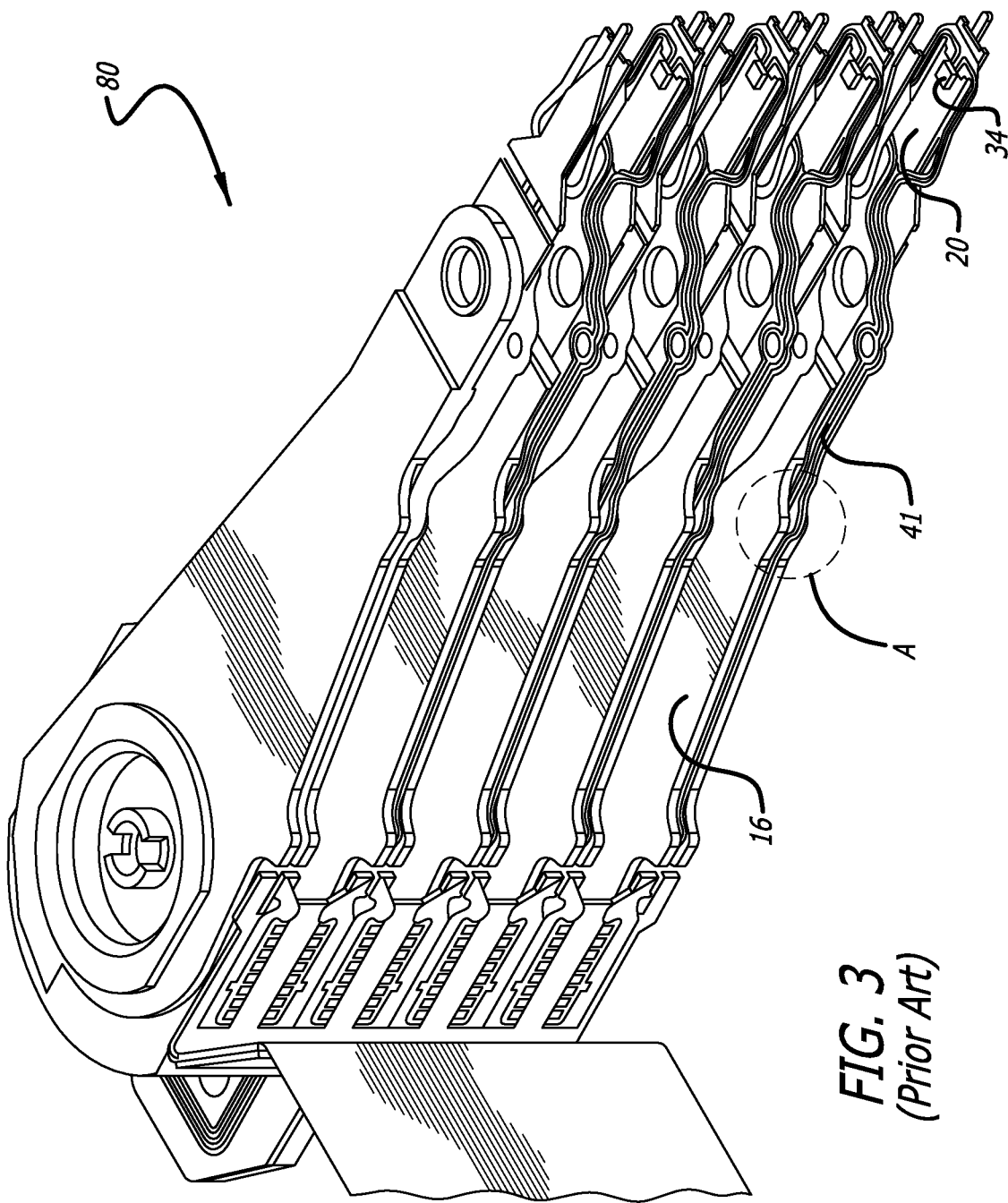
FIG. 3 is an oblique bottom view of a prior art head stack assembly.
Figure 4:
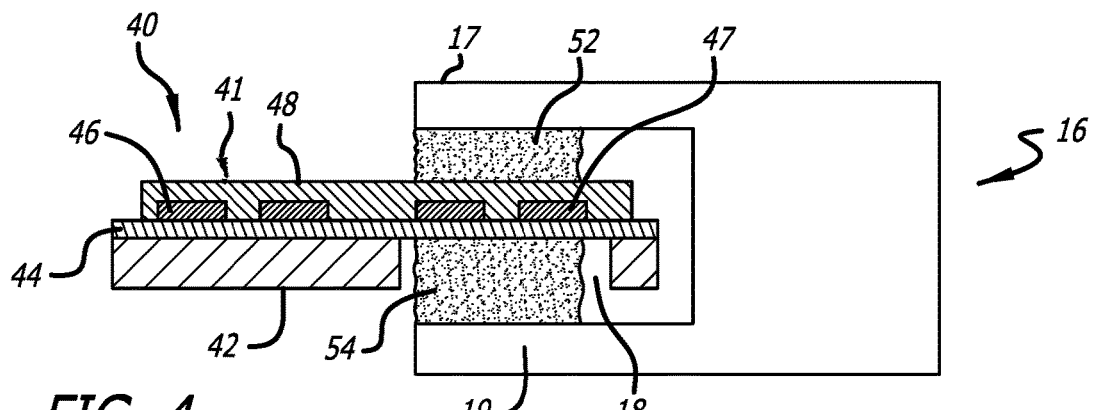
FIG. 4 is a cross-section of a prior art suspension circuit tail area partially within a slot in the actuator arm.
Figure 5A:
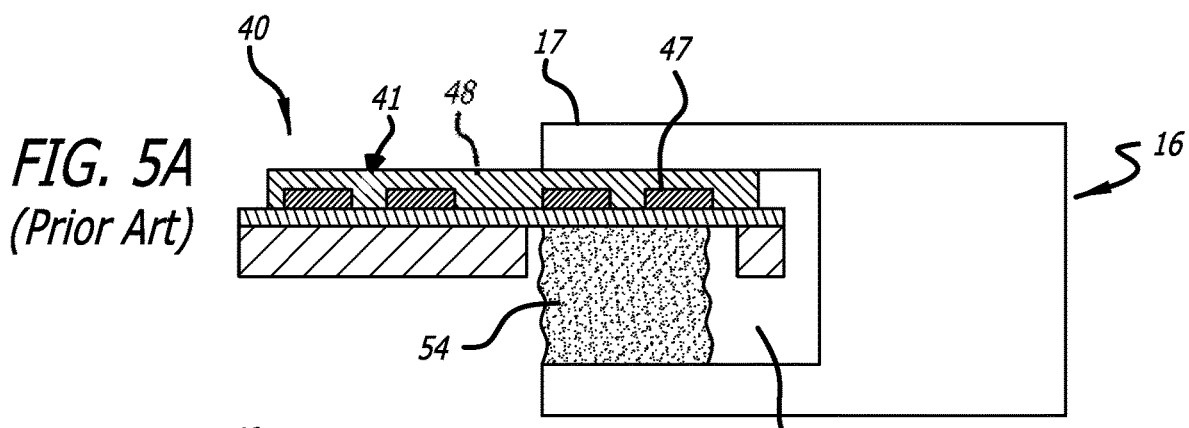
FIGS. 5A-5C are cross-sections of a prior art suspension circuit tail area partially within a slot in the actuator arm, showing possible variations in the height of the circuit tail within the slot.
Figure 5B:
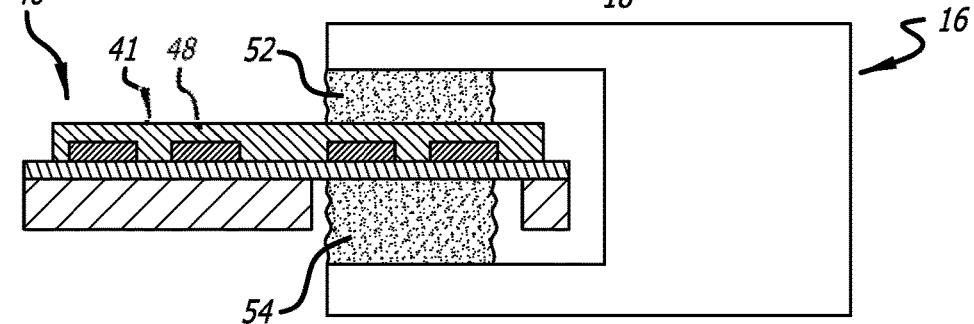
Figure 5C:
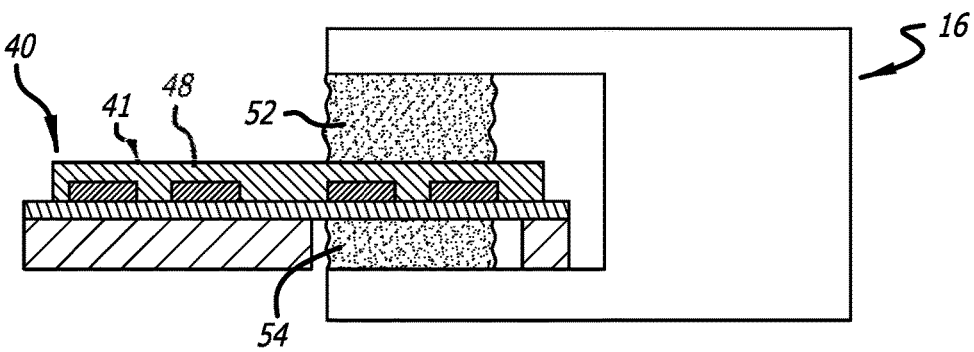
Figure 6A:
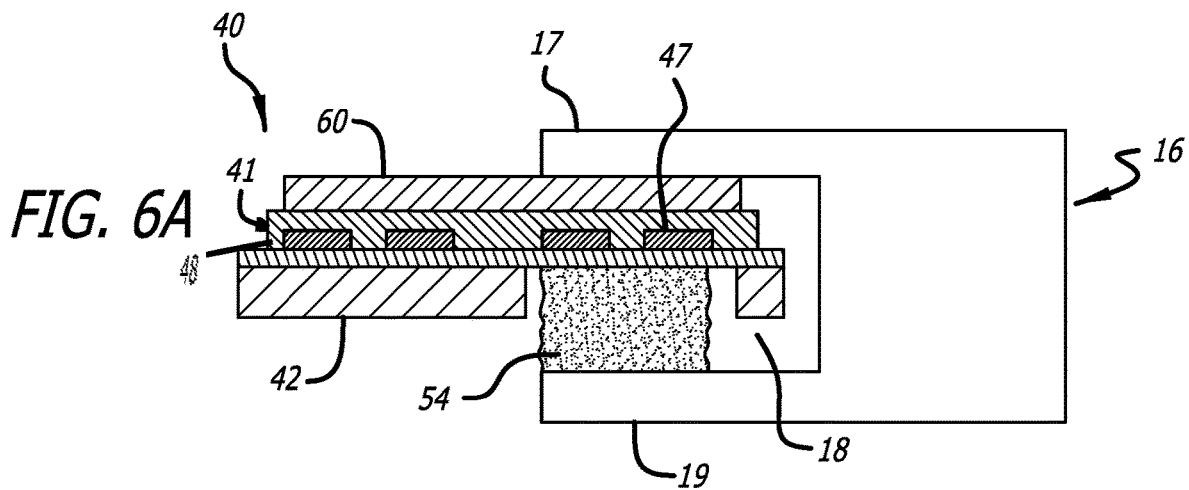
FIGS. 6A-6C are cross-sections of a circuit tail area partially within the slot in the actuator arm according to a first embodiment of the invention, showing possible variations in the height of the circuit tail within the slot.
Figure 6B:
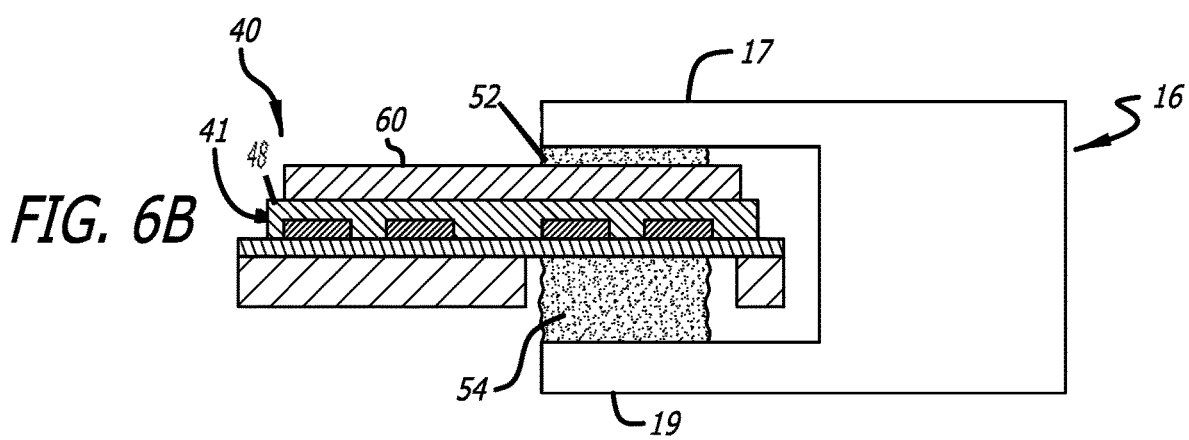
Figure 6C:
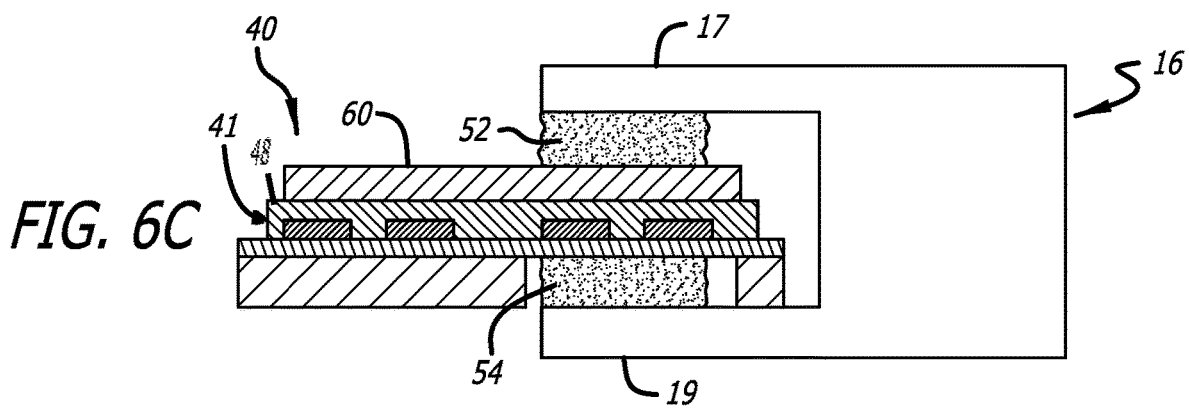

FIGS. 6A-6C are cross-sections of a circuit tail area 41 of circuit 40 partially within the slot 18 in the actuator arm 16 according to a first embodiment of the invention, showing possible variations in the height of the circuit tail within the slot. In this embodiment a dielectric spacer or shim 60 is added to the top of tail 41 over signal traces 47 to ensure the desired separation between the signal traces and the electrically conductive, and hence electrically dissipative, actuator arm upper wall 17. Tail 41 is then inserted into 18 in the actuator arm 16 as normal. The spacer 60 on the top of the tail ensures at least a minimum spacing between the circuit traces 47 and the adjacent conductive top wall 17 of actuator arm slot 18. That spacing will be at least the width of the usual insulating covercoat 48 over the traces plus the thickness of spacer 60. Preferably shim 60 ensures a separation distance of at least 0.5 mm from circuit traces 47 to a nearest conductive wall of actuator arm 16 in order to maintain high bandwidth.

Spacer 60 can be made of the same viscoelastic dampener sheet material from which the suspension vibration dampers are commonly made, with advantages that the dampener sheet material is usually of controlled thickness, has adhesive and a peel-off release liner already on it, and the automated machinery that makes the suspension including the standard suspension vibration dampener can be easily modified to include placing spacer 60 on circuit tail 41. Thus, spacer 60 can be adhered in solid form to circuit tail 41 and in particular over circuit traces 47 after the circuit has been formed but before the tail 41 gets inserted into slot 18.

Shim thicknesses of 0.5 mm-3.0 mm are within the range that is expected to improve the bandwidth of the tail circuit. Viscoelastic dampener thickness of approximately 1 to 2 mm are commercially available and can be applied in the tail of the suspension. Suspension manufacturers have high volume manufacturing processes for removing the release liner from dampeners and applying dampeners on suspensions, so modification of these tools can be easily accomplished to develop a process to apply the dampeners to the tail to act as dielectric spacers.

Figure 7:
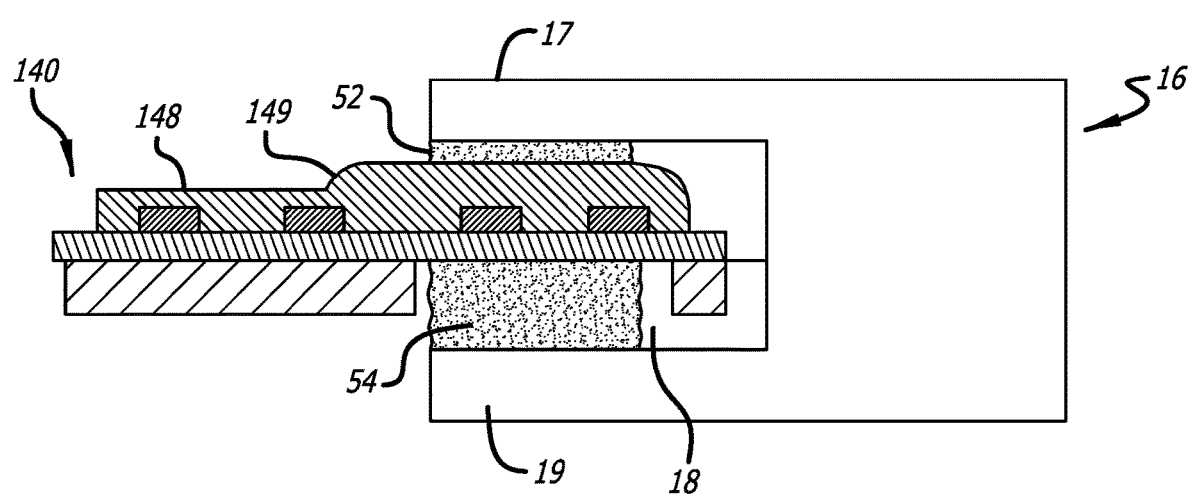
FIG. 7 is a cross-section of circuit tail area within the slot in the actuator arm according to a second embodiment of the invention.
Figure 8:
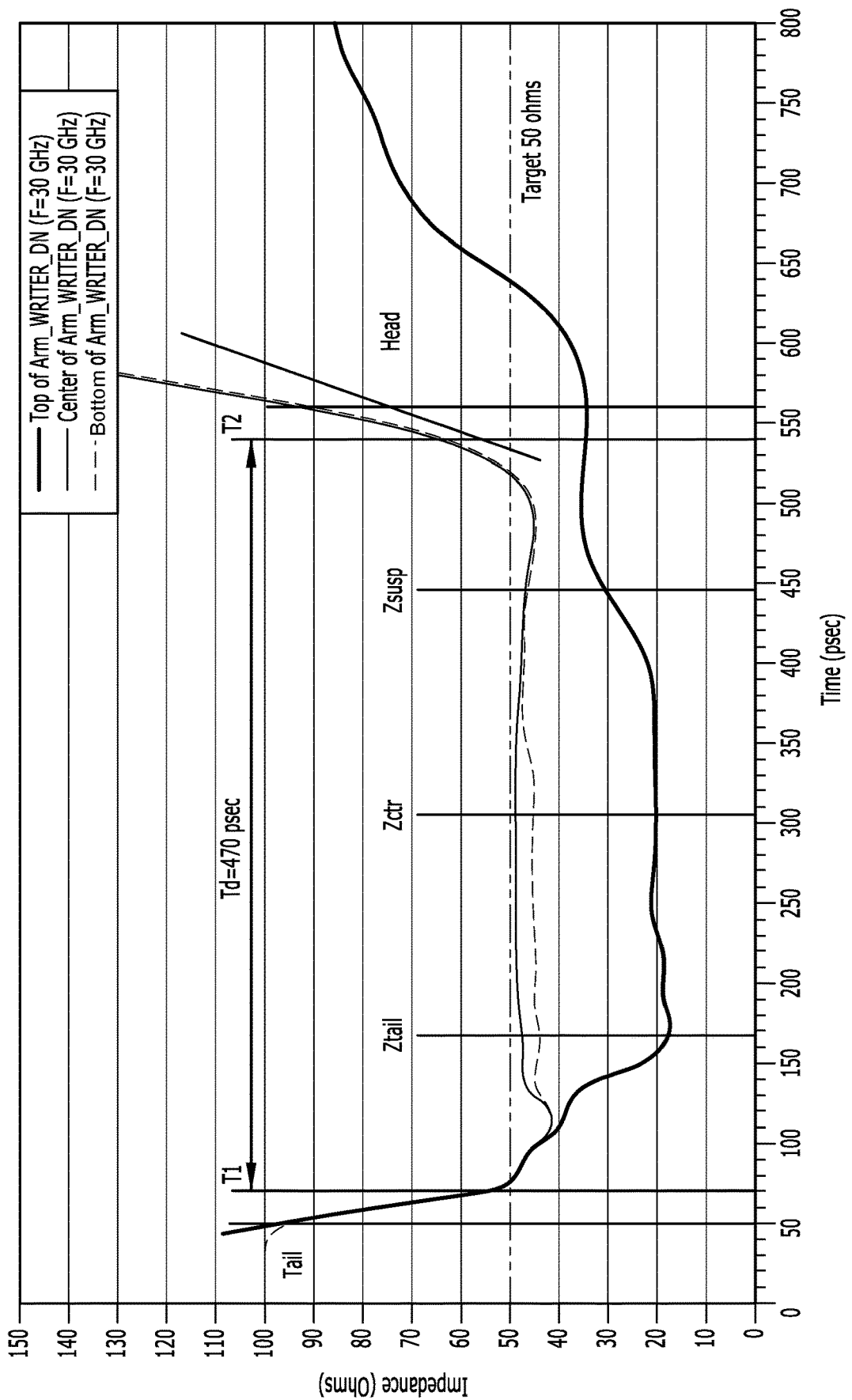
FIG. 8 is a graph showing time domain reflectometer (TDR) readings for data write signal traces for the tail being located at different heights within the actuator arm recess, according to a simulation.
Figure 9:
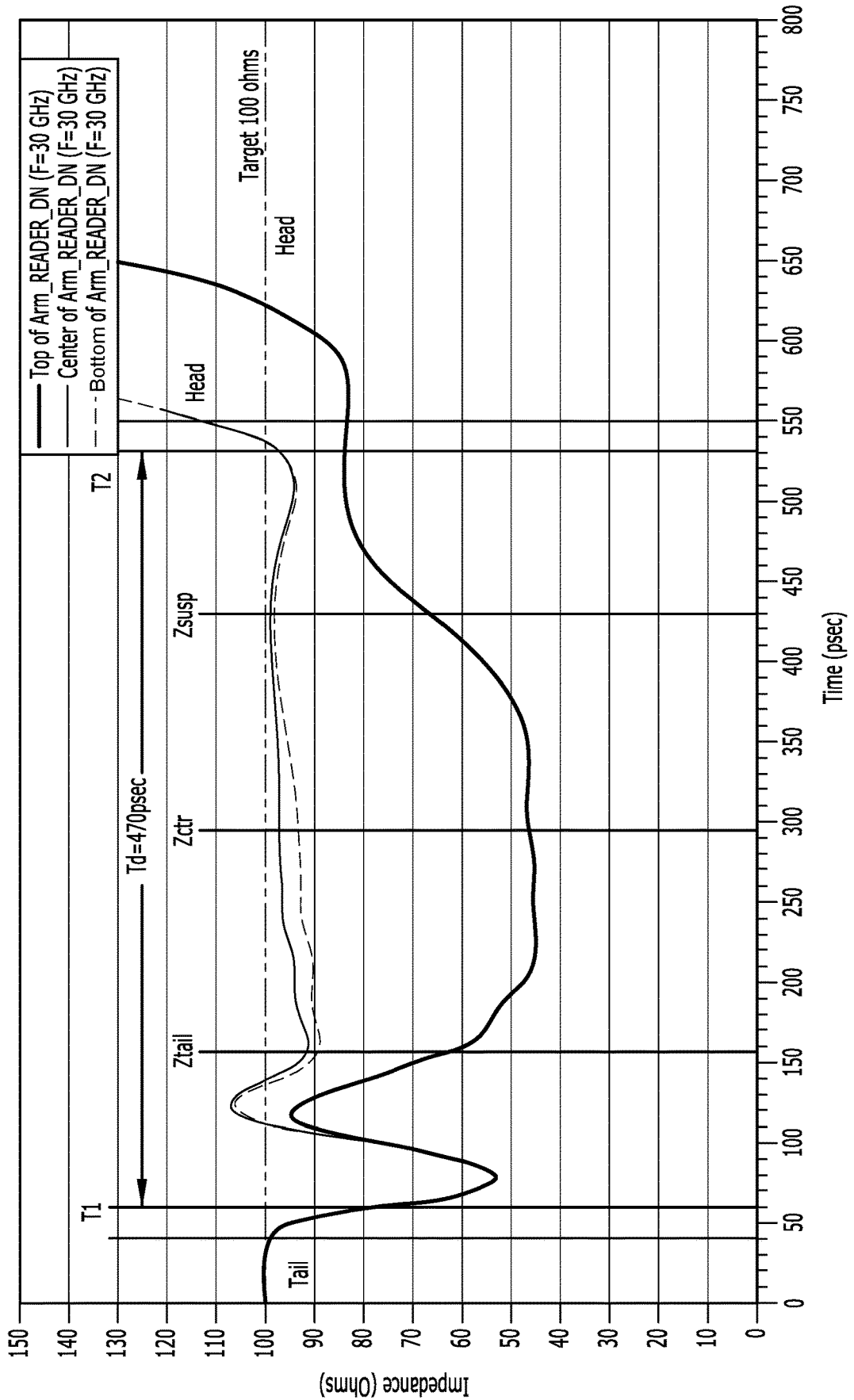
FIG. 9 is a graph showing TDR readings for data read signal traces for the tail being located at different heights within the actuator arm recess, according to a simulation.
Figure 10:
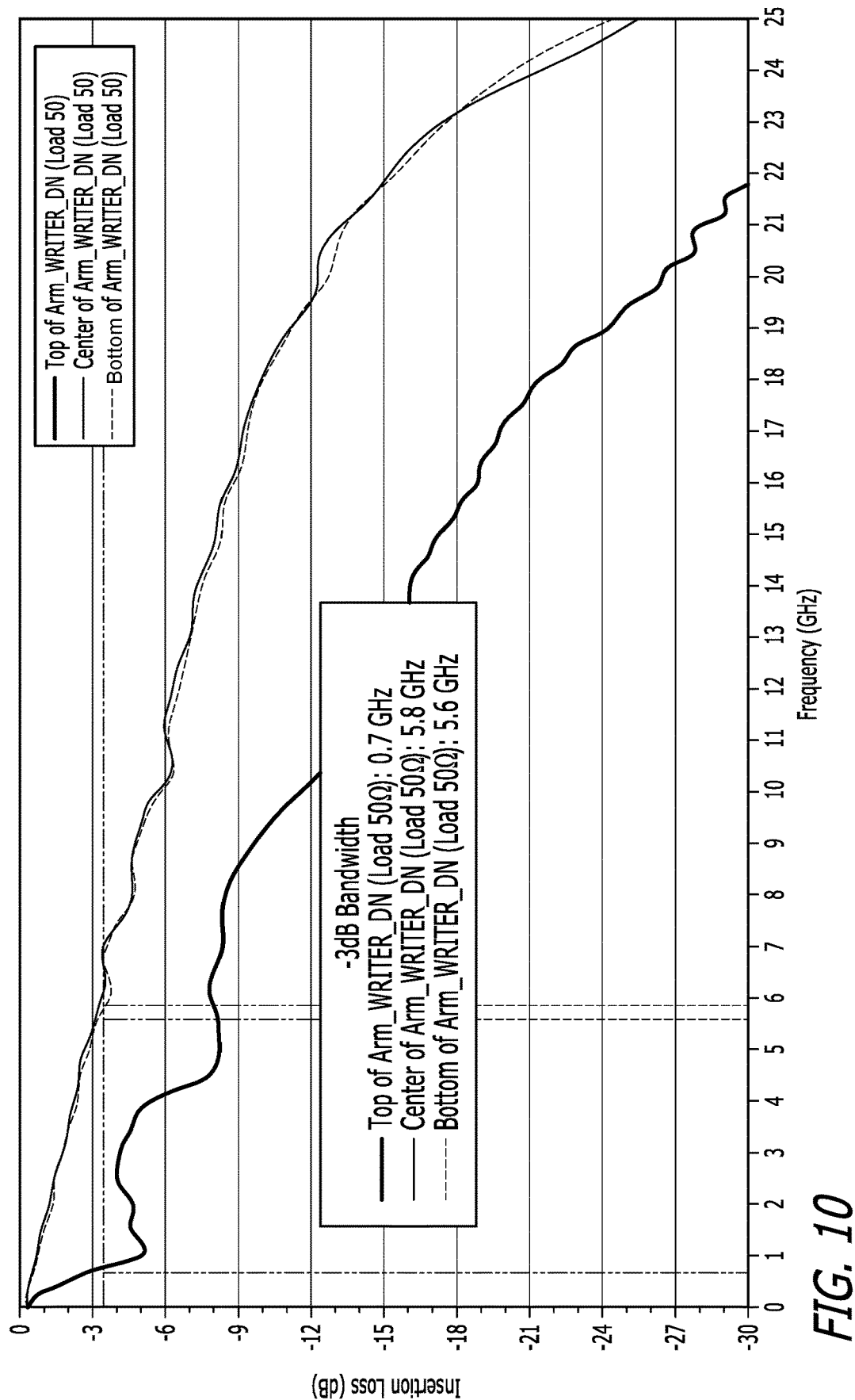
FIG. 10 is a graph of bandwidth of data write signals for the tail being located at different heights within the actuator arm recess, according to a simulation.
Figure 11:
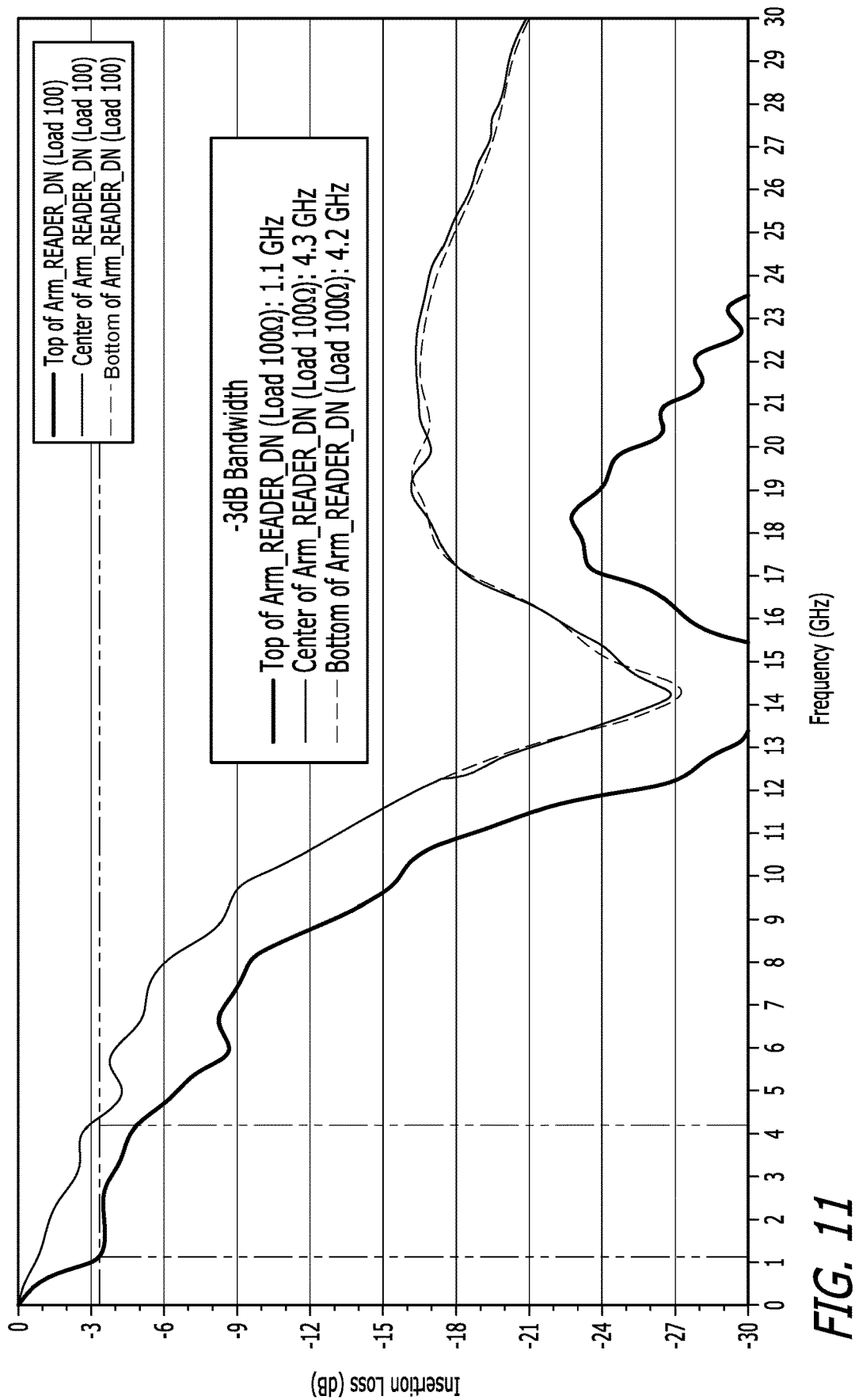
FIG. 11 is a graph of bandwidth of data read signals for the tail being located at different heights within the actuator arm recess, according to a simulation.

FIG. 7 is a cross-section of circuit tail area 140 within the slot 18 in the actuator arm 16 according to a second embodiment of the invention. In this embodiment, the spacer 160 takes the form of a thickened portion 149 of the covercoat 148 over the signal traces 47, such that the covercoat is thicker or thickest over the circuit traces in the tail area 140 that gets inserted into the actuator arm recess 18. Preferably the thickened area 149 of covercoat 148 is at least 0.5 mm thick, and more preferably at least 1.0 mm thick. Typical nominal thickness for the covercoat over a suspension circuit is approximately 3-5 µm. The thickness of the thickened portion of coverlayer could be, for example: thicker than the average thickness of the coverlayer along the length of the circuit; thicker than the nominal thickness of the coverlayer along the length of the circuit; thicker than the average thickness of the covercoat in an area that is distal of the actuator arm; thicker than at least one other portion of the flexure tail; thickest within the recess; thickest where it is inserted at least partially into the actuator arm; at least 50% thicker than an average covercoat thickness of the flexible circuit; at least 50% thicker than an average covercoat thickness of the flexible circuit in an area of the flexible circuit that is distal of the actuator arm; the thickest portion of the circuit covercoat; and/or at least 10 times the nominal thickness of the covercoat in the gimbal area of the circuit.

It will be understood that the terms "generally," "approximately," "about," and "substantially," as used within the specification and the claims herein allow for a certain amount of variation from any exact dimensions, measurements, and arrangements, and that those terms should be understood within the context of the description and operation of the invention as disclosed herein.

It will further be understood that terms such as "top," "bottom," "above," and "below" as used within the specification and the claims herein are terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

We claim:

1. A flexure comprising:
   a suspension circuit;
   a covercoat material formed on the suspension circuit; and
   a thickened area of the covercoat material adhered to the suspension circuit by adhesive, the thickened area of the covercoat material is formed on a top portion of the flexure and configured to maintain at least a distance between a portion of the suspension circuit and a wall of an actuator arm that is adjacent to the portion of the suspension circuit,
   the thickened area of the covercoat material is formed on the top portion of the flexure such that no electrically conductive layer is between the thickened area of the covercoat material and the wall of the actuator arm that is adjacent to the portion of the suspension circuit.

2. The flexure of claim 1 wherein the suspension circuit further comprise a suspension flexure tail.

3. The flexure of claim 1 wherein the thickened area of the covercoat is at least 0.5 mm thick.

4. The flexure of claim 1 wherein the thickened area of the covercoat is at least 1.0 mm thick.

5. The flexure of claim 1 wherein the thickened area of the covercoat is at least 50% thicker than the covercoat material formed on the suspension circuit.

\* \* \* \* \*